United States Patent [19]
Wanlass

[11] 3,881,146
[45] Apr. 29, 1975

[54] SELF-COMMUTATING FLUX-GATED INVERTER

[75] Inventor: Cravens L. Wanlass, Santa Ana, Calif.

[73] Assignee: Advance Power Incorporated, Anaheim, Calif.

[22] Filed: Apr. 15, 1974

[21] Appl. No.: 460,785

[52] U.S. Cl................ 321/2; 321/18; 321/45 R
[51] Int. Cl. ........................................... H02m 3/32
[58] Field of Search............ 321/2, 18, 45 R, 45 C, 321/43, 44

[56] References Cited
UNITED STATES PATENTS
3,518,526  6/1970  Genuit .................................. 321/2

Primary Examiner—R. N. Envall, Jr.
Attorney, Agent, or Firm—Lyon & Lyon

[57] ABSTRACT

A switching type voltage regulator having a self-commutating inverter input is disclosed. A DC voltage is supplied to an inverter combined with a flux-gated voltage regulator such as disclosed in U.S. Pat. No. 3,612,988. The inverter comprises a pair of silicon controlled rectifiers and associated diodes, the SCR's being alternately triggered to cause the switching of the core of the flux-gated regulator from a saturated to an unsaturated condition as in the normal operation of such a regulator. The SCR's are switched off in proper sequence without the need for any external signal by the action of the flux-gated regulator itself.

21 Claims, 2 Drawing Figures

SELF-COMMUTATING FLUX-GATED INVERTER

BACKGROUND OF THE INVENTION

Many voltage regulators or power conditions now available are of the switching type, that is, the output voltage is maintained constant by the use of an inverter circuit the output of which is controlled by a pulse with modulation feedback loop. The input to the inverter is usually a DC voltage derived from an AC line voltage and the output is passed through a suitable rectifying and filtering circuit to provide a regulated DC voltage. It has been found that the pulse width modulation creates severe filtering problems because of the presence of odd harmonics in the output of the inverter. The rectifying and filtering network must be designed to suppress these odd harmonics, a task which greatly increases their complexity and cost. Moreover, it has generally been found necessary to use RFI filters on both the input and the output of the device.

In addition to the filtering problems present in conventional switching regulators, it has been found necessary to use high speed transistors to perform the switching function in the inverter because of the power dissipation in the transistors if they do not switch rapidly from the off to the on condition. Furthermore, relatively complex control circuitry is required to switch the transistors off and on in the proper sequence. Thus, while the present day switching regulators are generally satisfactory with respect to operation, they are quite expensive to manufacture.

In my U.S. Pat. No. 3,612,988, the disclosure of which is incorporated by reference herein, there is disclosed a flux-gated voltage regulator in which a regulated output is obtained by controlling the volt-second integral of an inductor having a saturable core. The inductor is connected in series with a capacitor which acts as an energy sink or source during different portions of the cycle. When the core saturates, energy is transferred to the capacitor. As the capacitor charges, the current through the inductor decreases until it comes out of saturation. The capacitor now becomes the energy source and provides a voltage across the conductor. When the line voltage changes polarity the capacitor voltage and line voltage are in phase and as the line voltage increases the volt-second sum exceeds the volt-second capacity of the core and it again saturates. The capacitor discharges and recharges with the opposite polarity. As the cycle is repeated, the output becomes a constant amplitude modified square wave regardless of input voltage variation.

SUMMARY OF THE INVENTION

According to the present invention, a switching type voltage regulator is provided that is considerably less bulky and expensive than those heretofore available, these improvements in size and cost being realized without any sacrifice of performance. These advantages are achieved by utilizing a flux-gated regulator such as that disclosed in my U.S. Pat. No. 3,612,988 in combination with an inverter in such a manner that the regulator acts to commutate the inverter. As a result of this interaction between the regulator and the inverter, the inverter circuitry can be quite simple and can utilize inexpensive and slow acting silicon control rectifiers (SCR) or transistors. The operation of the device is such that a large current surge does not pass through the switching device until well after the SCR has switched to the conducting state with the result that there is no significant dissipation in the SCR (or transistor) itself. The overall circuit is self-commutating because the operation of the fluxgated regulator and the change in polarity of the current flowing therein causes each SCR to be switched off well before the other SCR is switched on by an external pulse.

Since the magnitude of the output voltage of the flux-gated regulator is responsive to the input frequency, a closed loop system can be established which provides a feedback signal responsive to any change in output voltage to change the frequency at which the inverter operates. No difficult to handle frequency component such as odd harmonics are introduced into the output of the regulator by this scheme and consequently the rectifying and filtering network necessary is quite straightforward and relatively inexpensive.

It is accordingly an object of the present invention to provide an improved switching type voltage regulator.

It is another object of the present invention to provide an inverter-regulator which is self-commutating.

DESCRIPTION OF THE INVENTION

Figure 1:
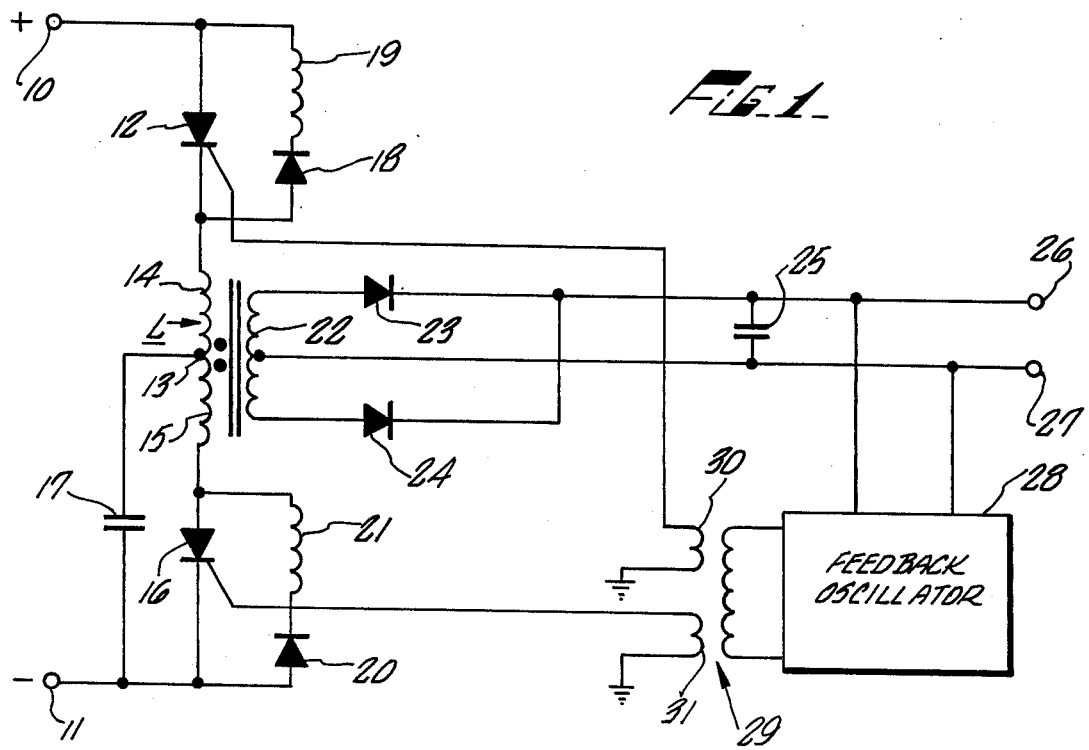
FIG. 1 is a schematic diagram of a regulating circuit according to a first embodiment of the present invention.

Turning now to FIG. 1 there is shown a regulating circuit which illustrates in schematic form the concepts of the present invention. A DC voltage, which may be a rectified voltage derived from an AC line, is applied across input terminals 10 and 11. Input terminal 10 is connected through a first SCR 12 to the upper end of an inductor coil L which is center tapped at 13 to provide separate coil sections 14 and 15. The inductor coil L is wound on any suitable saturable core such as those described in my aforementioned patent. The lower end of the coil L is connected through a second SCR 16 to input terminal 11. The center tap 13 of the coil L is connected to the terminal 11 through a capacitor 17. The SCR 12 is bypassed by a diode 18 poled in the opposite direction and, if desired, a small inductor 19. Similarly, the SCR 16 is shunted by a diode 20 and inductor 21. In the circuit thus far described, the coil L and the capacitor 17 form the flux-gated regulator such as that disclosed in my aforementioned patent while the SCR's 12 and 16 and their associated diodes 18 and 20 form the inverter. The values of the capacitance and inductance are not critical but the capacitor must be capable of being charged to a voltage sufficient to develop a volt-second value greater than the volt-second capacity of the inductor.

The coil L serves as the primary of a transformer, the secondary of which is a coil 22. The windings 14 and 15 of the coil L are polarized in the manner indicated such that a current flowing through either of them will have the same effect on the secondary winding 22. A conventional rectifying and filtering network composed of diodes 23 and 24 and capacitor 25 is connected to the output of the secondary winding 22 so that a DC voltage is supplied at output terminals 26 and 27. If desired, of course, this network could be deleted so that an AC output would be obtained. A sensing circuit of any conventional design employing a suitable oscillator 28 is connected across the output terminals 26 and 27. The oscillator 28 is preferably of the conventional type which produces a train of output pulses the frequency of which depends upon the input voltage, i.e., the voltage appearing across the output terminals 26 and 27. The output of the feedback oscillator 28 is applied to a pulse transformer 29 having a pair of secondaries 30 and 31 which supply pulses to the control electrodes of the SCR's 12 and 16, respectively. The feedback oscillator 28 is preferably provided with a small voltage input from any suitable source so that at rest, i.e., when no output voltage appears across terminals 26 and 27, the output of the oscillator 28 is a pulse train of low frequency.

In operation, when a DC voltage is initially applied across the terminals 10 and 11 the frequency of the inverter will be quite low because of the low frequency of the pulses produced by the feedback oscillator 28. As the output voltage rises, the output of the feedback oscillator 28 will rise with the result that the inverter frequency will rise until the desired output voltage is reached. The latter is, of course, determined by any suitable voltage reference device, such as a Zener diode, or the like, which forms a part of the feedback oscillator circuit 28. Assuming now that the DC voltage has been applied to terminals 10 and 11, the initial impedance of the coil section 14 of the coil L will be relatively small and the impedance of the capacitor 17 will be large because of the low frequency output of oscillator 28. When the SCR 12 is turned on as a result of receiving a pulse from the pulse transformer 29, a current will flow from the input terminal 10 through the SCR 12 and the coil section 14 to charge the capacitor 17. The voltage developed across the coil section 14 will, after a time, be sufficient to exceed the volt-second integral of the core with the result that the core will saturate.

Saturation of the core causes the energy stored in the coil section 14 to be transferred to the capacitor 17. The energy stored in the inductor is defined by the well known equation $E = \frac{1}{2} LI^2$ where E = energy, L = inductance, and I = current. Since this energy transfer has occurred after capacitor 17 has been partially charged, the voltage on the capacitor 17 will be greater than the line voltage, that is, more positive than the voltage appearing at the terminal 10 with the result that the capacitor 17 now becomes the source and current begins to flow through the coil section 14 in the opposite direction, this current passing through the diode 18 and the inductor 19 to the terminal 10. The current through the diode 18 causes the SCR 12 to be back-biased with the result that it turns off. The inductor 19 is provided simply for the purpose of enhancing this turning off of the SCR 12 by impressing a small reverse bias voltage across it, and is not essential to the operation of the device.

The SCR 16 is now turned on by reason of the pulse applied to its control electrode by the pulse transformer 29. The current discharging the capacitor 17 now ceases to flow through the coil section 14 of the inductor coil L and begins to flow through the coil section 15 and the SCR 16 as the potential difference between the upper plate of the capacitor 17 and the terminal 11 is greater than the potential difference between the upper plate of the capacitor 17 and the terminal 10. The voltage across the coil section 15 is thus greater than the voltage previously impressed across the coil section 14 by an amount equal to the DC voltage across terminals 10 and 11 with the result that after a short time the volt-second integral of the core of the inductor L is again exceeded and it saturates. The energy previously stored in the coil section 15 is now transferred to the capacitor 17 which becomes charged in the opposite direction. The current now reverses, passing through the diode 20 and inductor 21 and causing the SCR 16 to be turned off.

SCR 12 is now again triggered so that current from the source flows through the coil section 14 and is added to that of the current flowing through the coil winding section 15 with the result that the volt-second integral of the inductor L is again exceeded and it saturates. The energy stored in the inductor L is again transferred to the capacitor 17 with the result that the voltage across the capacitor is once again greater than the input voltage and the current once again reverses and passes upwardly through the coil section 14 and the diode 18, cutting off the SCR 12. The cycle now continues to repeat itself with the result that a modified square wave output is generated in the output winding 22 and a DC voltage appears across terminals 26 and 27. In the event that the output voltage changes for any reason, the frequency of the oscillator 28 changes with the result that the frequency of the inverter made up of SCR's 12 and 16 and diodes 18 and 20 changes, thereby changing the output voltage of the flux-gated voltage regulator until it returns to the desired level.

While the foregoing explanation of the circuit shown is believed to best describe the physical phenomena present in its operation, it should be understood that it is only the best presently available and is not meant in any way to limit the scope of the present invention.

Figure 2:
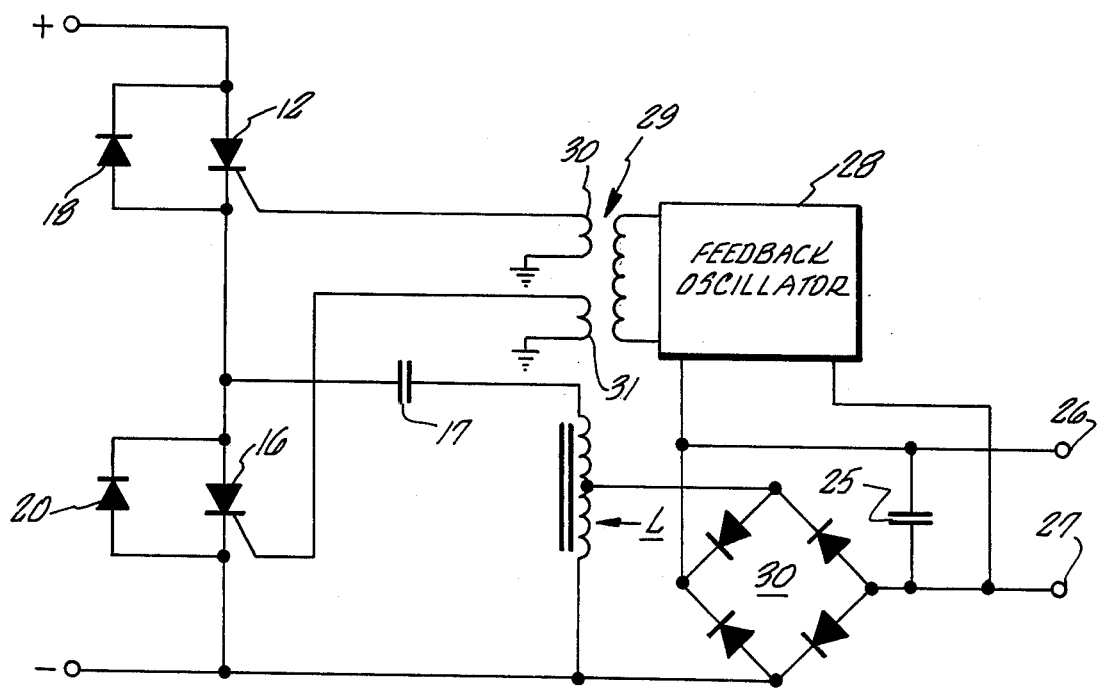
FIG. 2 is a schematic diagram of a regulating circuit according to a second embodiment of the present invention.

FIG. 2 illustrates another embodiment of the present invention, and similar reference numbers are used to identify the elements similar to those found in FIG. 1. As can be seen, this embodiment is similar to that shown in FIG. 1 in all essential respects, except that the inductor L is not center tapped. This does not effect the mode of operation of the circuit. FIG. 2 further illustrates that the output can be directly taken from the inductor L and rectified by a rectifier bridge 30.

From the foregoing description it can be seen that each of the SCR's 12 and 16 are turned on well before the core of the inductor L switches from an unsaturated to a saturated condition. Since it is at this switching point that large current surges occur, the present invention permits the use of slow acting SCR's without any significant power dissipation. This permits a substantial saving in the cost of components. Of course, these SCR's can be replaced by transistors as will be apparent to those skilled in the art. Like the SCR's, the transistors can be of the slow switching variety. It should be understood that the circuitry illustrated is quite simple and has been found to be quite satisfactory but is by no means the only inverter circuitry that could be used in the practice of the present invention. It should further be understood that the various core configurations and feedback networks disclosed in my aforementioned patent could also be employed in the practice of the present invention. Thus, the inverter could be operated at a constant frequency and the output voltage regulated by controlling the volt-second integral of the core in another matter, e.g., by a bias voltage - representative of the output voltage. The foregoing is thus intended to

I claim:

1. A self-commutating inverter-regular circuit comprising:
   an input circuit;
   a series circuit comprising a capacitor and an inductor having a non-linear inductance characteristic;
   inverter means including at least two switching means operable in a first state to permit current flow therethrough and in a second state to prevent current flow therethrough, said inverter means connecting said capacitor-inductor circuit to said input circuit;
   external means for alternately triggering said switching means into said first state resulting in energy being transferred from said inductor means to said capacitor by reason of a reduction in the inductance of said inductor, said energy transfer causing the current in said capacitor-inductor circuit to reverse causing the switching means to be switched to said second state; and
   an output circuit coupled to said capacitor-inductor circuit.

2. The circuit of claim 1 wherein said output circuit comprises rectifying and filtering means.

3. The circuit of claim 2 wherein said external means is coupled to said output circuit and is responsive to the output voltage appearing thereacross.

4. The circuit of claim 3 wherein said external means comprises means for generating a series of pulses, the frequency of which is dependent upon said output voltage.

5. The circuit of claim 1 wherein said inverter means further comprises at least two unidirectional means connected across said switching means and poled in the opposite direction.

6. The circuit of claim 5 wherein said switching means comprise controlled rectifier means.

7. The circuit of claim 6 wherein said external means is coupled to said output circuit and is responsive to the output voltage appearing thereacross.

8. The circuit of claim 6 wherein said external means comprises means for generating a series of pulses, the frequency of which is dependent upon said output voltage.

9. A self-commutating inverter-regulator circuit comprising:
   an input circuit;
   inductor means having saturable core means;
   capacitor means;
   means coupling said inductor means and said capacitor means in a series circuit;
   said capacitor means being capable of being charged to a voltage sufficient, when added to an input voltage, to develop a volt-second value across said inductor means greater than the volt-second capacity of said inductor means so that said inductor means will be driven into saturation;
   inverter means including at least two switching means operable in a first state to permit current flow therethrough and in a second state to prevent current flow therethrough, said inverter means connecting said capacitor-inductor circuit to said input circuit;
   external means for alternately triggering said switching means into said first state, triggering of each of said switching means into said first state resulting in energy being transferred from said inductor means to said capacitor means, such energy transfer causing the current in said capacitor-inductor circuit to reverse and switch said switching means to said second state; and
   an output circuit coupled to at least a portion of said inductor means.

10. The circuit of claim 9 wherein said output circuit comprises rectifying and filtering means.

11. The circuit of claim 9 wherein said external means is coupled to said output circuit and is responsive to the output voltage appearing thereacross.

12. The circuit of claim 9 wherein said external means comprises means for generating a series of pulses, the frequency of which is dependent upon said output voltage.

13. The circuit of claim 9 wherein said inverter means further comprises at least two unidirectional means connected across said switching means and poled in the opposite direction.

14. The circuit of claim 9 wherein said switching means comprise controlled rectifier means.

15. The circuit of claim 9 wherein said external means is coupled to said output circuit and is responsive to the output voltage appearing thereacross.

16. The circuit of claim 9 wherein said external means comprises means for generating a series of pulses, the frequency of which is dependent upon said output voltage.

17. A self-commutating inverter-regulator circuit comprising:
   a pair of input terminals for receiving DC voltage;
   inductor means having saturable core means;
   capacitor means, said capacitor means being capable of being charged to a voltage sufficient, when added to an input voltage, to develop a volt-second value greater than the volt-second capacity of said inductor means;
   first switching means connecting said capacitor means and at least a portion of said inductor means across said input terminals;
   second switching means connecting said capacitor means across at least a portion of said inductor means;
   means for alternately triggering said switching means into conduction; and
   triggering of said first switching means causing said capacitor means to charge and said inductor means to saturate whereby said capacitor means begins to discharge thereby switching said switching means out of conduction; subsequent triggering of said second switching means causing said capacitor means to discharge across at least a portion of said inductor means and said inductor means to saturate whereby said capacitor means begins to discharge in the opposite direction thereby switching said second switching means out of conduction.

18. A self-commutating inverter-regulator circuit comprising:
   an input for receiving a DC voltage;
   inductor means having saturable core means;
   capacitor means being capable of being charged to a voltage greater than said DC voltage;

switching means operable in a first state to permit current flow therethrough and in a second state to prevent current flow therethrough;

means connecting said switching means, said inductor means and said capacitor means in series across said input; and means to switch said switching means to said first state whereby current from said source charges said capacitor, said current being sufficient to cause the voltsecond capacity of said inductor means to be exceeded and said inductor means to saturate causing the energy stored therein to be transferred to said capacitor means, raising the voltage across said capacitor means to a value greater than said DC voltage whereby said switching means becomes back-biased and switches to said second state.

19. A self-commutating inverter-regulator circuit comprising:

a pair of input terminals for receiving a DC voltage;

inductor means having saturable core means;

capacitor means, said capacitor means being capable of being charged to a voltage sufficient, when added to an input voltage, to develop a volt-second value greater than the volt-second capacity of said inductor means;

first assymmetrical switching means operable to conductively connect said capacitor means and at least a portion of said inductor means across said input terminals;

second assymmetrical switching means operable to conductively connect said capacitor means across at least a portion of said inductor means;

first diode means connected across said first switching means and poled in the opposite direction;

second diode means connected across said second switching means and poled in the opposite direction;

means for alternately operating said first and second switching means; and an output circuit coupled across at least a portion of said inductor means.

20. A method of self-commutating a switching device by means of a series circuit comprising a capacitor and an inductor having a saturable core comprising:

triggering said switching device into a conductive state;

passing a current to said inductor-capacitor circuit through said switching device to charge said capacitor;

developing a volt-second value across said inductor greater than the volt-second capacity of said inductor to drive said inductor into saturation;

transferring the energy stored in said inductor to said capacitor to cause the current in said inductor-capacitor circuit to reverse and switch said switching device into a non-conductive state; and taking an output from across at least a portion of said inductor.

21. A method of self-commutating an inverter having at least two switching devices operable in a first state to permit current flow therethrough and in a second state to prevent current flow therethrough by means of a series circuit comprising a capacitor and an inductor having a saturable core comprising:

triggering a first of said switching devices into a conductive state;

passing a current to said inductor-capacitor circuit through the conductive switching device to charge said capacitor;

developing a volt-second value across said inductor greater than the volt-second capacity of said inductor to drive said inductor into saturation;

transferring the energy stored in said inductor to said capacitor to cause the current in said inductor-capacitor circuit to reverse and switch said conductive switching device into a non-conductive state;

triggering the other of said switching devices into the conductive state;

developing a volt-second value across said inductor greater than the volt-second capacity of said inductor to drive said inductor into saturation;

transferring the energy stored in said inductor to said capacitor to cause the current in said inductor-capacitor circuit to reverse and switch said other switching device into a non-conductive state;

repeating the foregoing steps a plurality of times; and taking an output from across at least a portion of said inductor.

* * * * *